United States Patent
Mari et al.

(10) Patent No.: US 11,933,612 B2
(45) Date of Patent: Mar. 19, 2024

(54) METHOD FOR RPC REFINEMENT BY MEANS OF A CORRECTIVE 3D ROTATION

(71) Applicant: Kayrros, Paris (FR)

(72) Inventors: Roger Mari, Barcelona (ES); Gabriele Facciolo, Cachan (FR); Jérémy Anger, Bourg-la-Reine (FR); Carlo De Franchis, Paris (FR)

(73) Assignee: Kayrros (FR)

(*) Notice: Subject to any disclaimer, the term of this patent is extended or adjusted under 35 U.S.C. 154(b) by 422 days.

(21) Appl. No.: 17/381,554

(22) Filed: Jul. 21, 2021

(65) Prior Publication Data
US 2023/0032712 A1    Feb. 2, 2023

(51) Int. Cl.
*G01C 11/02* (2006.01)
*G01C 11/14* (2006.01)
(Continued)

(52) U.S. Cl.
CPC .............. *G01C 11/30* (2013.01); *G01C 11/02* (2013.01); *G01C 11/14* (2013.01); *G01C 11/26* (2013.01);
(Continued)

(58) Field of Classification Search
CPC ......... G01C 11/02; G01C 11/14; G01C 11/26; G01C 11/30; G03B 37/04; G06T 7/593;
(Continued)

(56) References Cited

U.S. PATENT DOCUMENTS

2015/0371431 A1* 12/2015 Korb .................. G06T 7/75
382/113

OTHER PUBLICATIONS

Mari et al; "To Bundle Adjust or Not: A Comparison of Relative Geolocation Correction Strategies for Satellite Multi-View Stereo"; HAL Id: hal-02354494; Submitted on Nov. 7, 2019, 1 pages.

* cited by examiner

*Primary Examiner* — Kenny A Cese
(74) *Attorney, Agent, or Firm* — Lerner David LLP

(57) ABSTRACT

The invention relates to computer-implemented method for the 3D reconstruction of a ground surface area by stereo-photogrammetry, comprising the steps of:
determining corrected Rational Polynomial Camera, RPC, models by performing bundle adjustment (BA) of original RPC models each provided with an image of a set of images of the ground surface area acquired by a remote imaging sensor and each associated to a corresponding original projection function ($\{P_m\}$) from a 3D object space to a 2D image space, wherein determining the corrected RPC models comprises determining corrected projection functions ($\{P_m^{cor}\}$) from the 3D object space to the 2D image space; and
determining (PC) a 3D point cloud representative (3DPC) of the ground surface area by triangulation, based on the corrected RPC models, of stereo correspondences within images of the set of images.
In accordance with the invention, determining the corrected projection functions comprises determining, for each of the original projection function, a 3D corrective rotation around a remote imaging sensor center to be applied in the 3D space before performing the original projection function.

15 Claims, 1 Drawing Sheet

(51) Int. Cl.
*G01C 11/26* (2006.01)
*G01C 11/30* (2006.01)
*G03B 37/04* (2021.01)
*G06T 7/593* (2017.01)
*G06T 7/80* (2017.01)

(52) U.S. Cl.
CPC ............... *G03B 37/04* (2013.01); *G06T 7/80* (2017.01); *G06T 7/593* (2017.01); *G06T 2207/10021* (2013.01); *G06T 2207/10028* (2013.01)

(58) Field of Classification Search
CPC ............. G06T 7/80; G06T 2207/30181; G06T 2207/10028; G06T 2207/10021; G06T 2207/10032
USPC ........................................................ 382/154
See application file for complete search history.

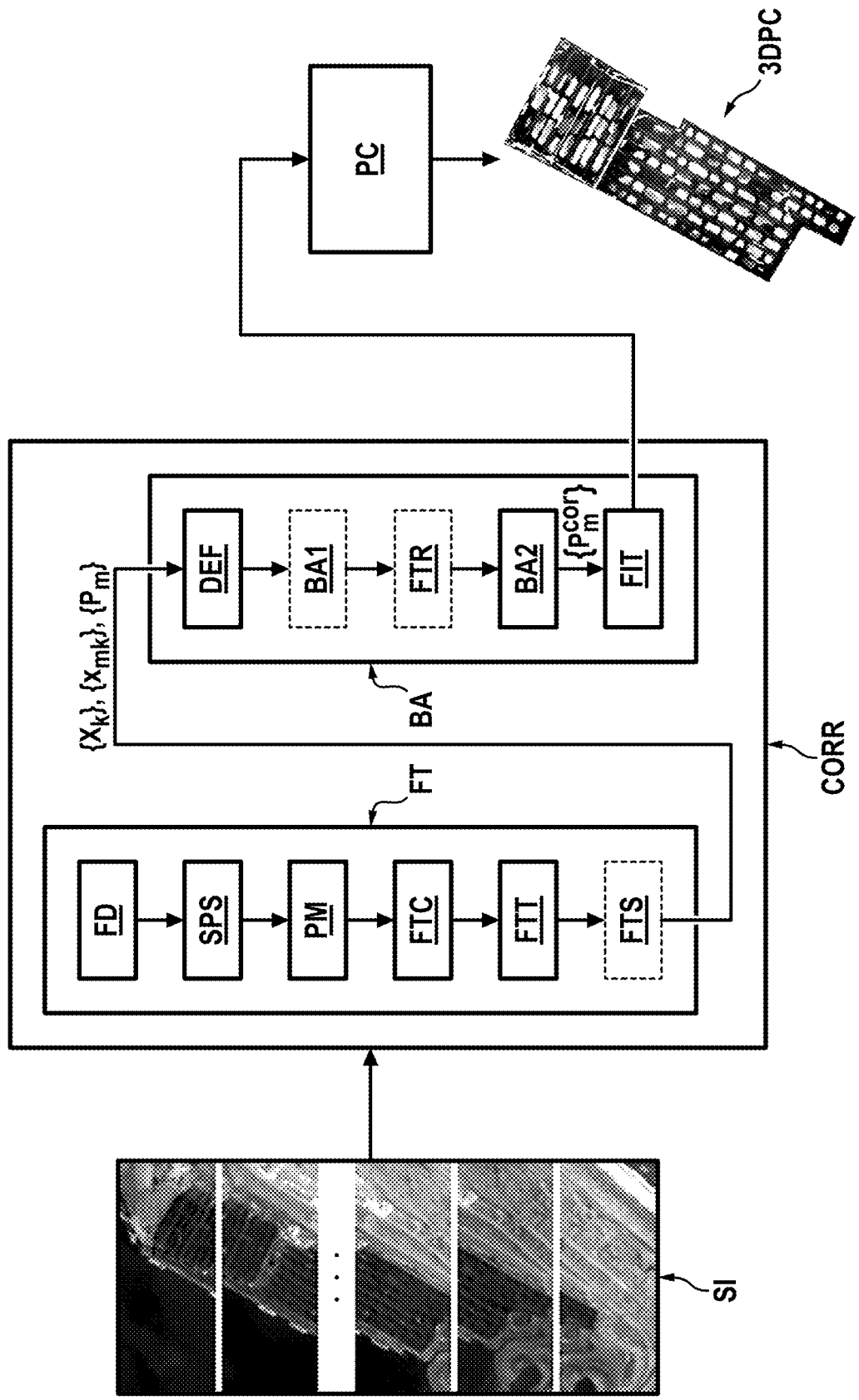

METHOD FOR RPC REFINEMENT BY MEANS OF A CORRECTIVE 3D ROTATION

TECHNICAL FIELD

The field of the invention is that of 3D reconstruction of a ground surface area from images acquired by a remote imagery device, such as an imaging sensor on board a satellite. The invention more particularly relates to the refinement of the Rational Polynomial Camera (RPC) model associated to each image in order to prevent pointing errors from affecting the triangulation of 3D points and the accuracy of the generated 3D reconstruction.

DESCRIPTION OF RELATED ART

Satellite imagery allows to classify, segment and make measurements over large areas without on-site surveys. Today's abundance of Earth observation satellite images, notably due to the breakthrough of small satellites (SmallSats), explains this growing trend. SmallSat constellations have many low-cost satellites flying at low-altitude orbits, that produce high-resolution images with short revisit times, e.g. PlanetScope, SkySat.

Unlike traditional satellite imagery, SkySat products are delivered as mosaics of images, each with a small geographic footprint. These are acquired using pushframe acquisition systems that ensure a certain overlap between consecutive scenes. Each scene is provided with a Rational Polynomial Camera (RPC) model which is a generic camera model widely used to describe the acquisition process of optical satellite sensors independently from the specific physical properties of the sensor. The RPC model associated with each satellite image relates 3D object space coordinates to 2D image space coordinates. Both the 3D to 2D mapping (the projection function) and its inverse (the localization function) are expressed mathematically as a ratio of cubic polynomials.

The projection function P of a RPC model can be expressed as:

$$(r, c) = P(X, Y, Z) = \left(\frac{a(X, Y, Z)}{b(X, Y, Z)}, \frac{e(X, Y, Z)}{f(X, Y, Z)}\right)$$

where a, b, e and f are cubic polynomials of 20 coefficients each; X, Y, Z represent the longitude, latitude and height of a 3D point; and r, c are the row and column of its projection on the image plane.

Given a 2D point correspondence across two or more satellite images, the associated RPCs can be used to triangulate and retrieve the 3D point that projects on them. Although RPCs are expected to be precise enough to describe the acquisition process, the complex system they encode is subject to measurement errors of the satellite geopositioning. Such inaccuracies can easily cause a 3D point to project tens of pixels away from its real image location following a RPC projection. This implies that the multiple views of a scene are typically not consistent in a common frame of reference. Hence, RPCs may introduce systematic errors in the triangulation of stereo correspondences, substantially degrading the accuracy of 3D models reconstructed from multiple views.

In this context, designing efficient RPC correction strategies has become essential to effectively harness multi-view satellite imagery for large scale 3D reconstruction.

Over the past two decades, researchers have thoroughly investigated the problem of RPC refinement. The literature can be broadly divided into indirect or direct approaches. Indirect refining methods propose complementary functions, defined in image or 3D space, which are composed with the original RPC functions to correct the camera models. Oppositely, direct methods seek to explicitly modify the RPC coefficients. The variables involved in the RPC correction process are usually tuned based on a set of Ground Control Points, i.e. tie points seen in the images whose absolute location in the 3D object space is known. In absence of GCPs, keypoint feature detectors can be used to infer tie points between two or more images and perform a relative correction (not absolute) between the input cameras. Due to the complexity of the task, direct methods typically demand a larger number of tie points and are prone to poorer stability and accuracy with respect to indirect methods, which are the most common practice.

Nowadays, bundle adjustment strategies based on the minimization of the reprojection error associated with the available tie points represent the standard solution for RPC correction in most state-of-the-art pipelines for 3D reconstruction from satellite images.

More particularly, bundle adjustment can be expressed as the problem of jointly optimizing the parameters of multiple cameras and the 3D locations of the objects they observe. Given an initial set of K 3D points $\{X_k\}_{k=1,\ldots,K}$ and their MK 2D observations $x_{mk}$ across M cameras with projection functions $\{P_m\}_{m=1,\ldots,M}:R^3 \to R^2$, bundle adjustment finds the optimal solution by minimizing the reprojection error:

$$\bar{p}(\{P_m\}, \{X_k\}) = \sum_{k=1}^{K}\sum_{m=1}^{M} \|x_{mk} - P_m(X_k)\|^2,$$

where $\{X_k\}$ and $\{P_m\}$ contain the variables to be adjusted. Following the above equation, the reprojection error $\bar{p}$ is typically defined as the sum of squared Euclidean distances between the estimated reprojections of the 3D points, i.e. $P_m(X_k)$, and their actual 2D observations in the images, i.e. $x_{mk}$.

BRIEF DESCRIPTION OF THE INVENTION

The invention aims at improving indirect RPC correction techniques in order to offer 3D reconstructions of improved quality. To this purpose, the invention discloses a computer-implemented method for the 3D reconstruction of a ground surface area by stereophotogrammetry, comprising the steps of:
  determining corrected Rational Polynomial Camera, RPC, models by performing bundle adjustment of original RPC models each provided with an image of a set of images of the ground surface area acquired by a remote imaging sensor and each associated to a corresponding original projection function from a 3D object space to a 2D image space; and
  determining a 3D point cloud representative of the ground surface area by triangulation, based on the corrected RPC models, of stereo correspondences within images of the set of images.

Determining the corrected RPC models comprises determining corrected projection functions from the 3D object space to the 2D image space. Determining the corrected projection functions comprises determining, for each of the original projection function, a 3D corrective rotation around a remote imaging sensor center to be applied in the 3D space before performing the original projection function.

Certain preferred, but non-limiting aspects of the method are as follows:

It further comprises, for each of the original projection functions, determining a projective model that approximates the original RPC model corresponding to the original projection function and selecting the center of that projective model as the remote imaging sensor center;

Determining the corrected projection functions comprises determining, for each of the original projection function $P_m$, a corrected projection function expressed as $P_m^{cor}(X)=P_m(R_m(X-C_m)+C_m)$ where X is a 3D point, $C_m$ is the remote imaging sensor center and $R_m$ is the 3D corrective rotation which is applied in the 3D space before the original projection function is performed;

Determining the corrected projection functions comprises solving an optimization problem aiming at minimizing a reprojection error between locations in the 2D image space of key points detected in the set of images and projections, by the corrected projections, in the 2D image space of locations in the 3D object space of said key points;

The optimization problem is initialized with each 3D corrective rotation being set as an identity rotation;

The optimization problem is initialized with a 3D corrective rotation associated to one of the original projection functions being set as unmodifiable;

The reprojection error is expressed as $\bar{\rho}=\Sigma_{k=1}^{K}\Sigma_{m=1}^{M}\|P_m(R_m(X_k-C_m)+C_m)-x_{mk}\|^2$, where $x_{mk}$ is the location in the 2D image space of a key point detected in an image of the set of images and $X_k$ is the location in the 3D object space of said key point;

The optimization problem is iteratively solved by a first set of iterations performed until a $L^1$-norm cost function falls below a first threshold and by a second set of iterations performed after said first set of iterations until a $L^2$-norm cost function falls below a second threshold;

It further comprises:
  after the first set of iterations, comparing a keypoint reprojection error to a rejection threshold, wherein a keypoint reprojection error is the difference between a keypoint location in the 2D image space and a projection, by a corrected projection determined by the first set of iterations, in the 2D image space of the keypoint location in the 3D object space;
  rejecting keypoints which keypoint reprojection error is above the rejection threshold before performing the second set of iterations;

It further comprises a preliminary step of determining locations in the 2D image space and in the 3D object space of a set of tie points and wherein the optimization problem is initialized with each key point being set as a tie point of said set of tie points;

Said preliminary step comprises detecting distinctive points in the set of images by performing an affine invariant image matching operation;

Said preliminary step further comprises triangulating, based on the original RPC models, stereo correspondences of the distinctive points within the images of the set of images;

It further comprises rejecting tie points from the set of tie points before initializing the optimization problem.

BRIEF DESCRIPTION OF THE DRAWINGS

Other aspects, aims, advantages and features of the invention will better appear upon reading the following detailed description of preferred embodiments thereof, provided as a non-limiting example, and done in reference to the appended drawings, in which FIG. 1 is a block diagram illustrating the various steps of a method according to a possible embodiment of the invention.

DETAILED DESCRIPTION OF THE INVENTION

The invention relates to a computer-implemented method for the 3D reconstruction of a ground surface area (a certain area of interest) by stereophotogrammetry based on a set of two or more images of the ground surface area acquired by a remote imaging sensor, such as an imaging sensor on board a satellite, for instance on board a SmallSat.

This method comprises a RPC (Rational Polynomial Camera) model refinement step which consists in determining corrected RPC models by performing bundle adjustment of original RPC models each provided with an image of the set. More particularly, the RPC refinement step comprises solving an optimization problem to determine, for each image, a corrected RPC model.

Each (original/corrected) RPC model is associated with a corresponding (original/corrected) projection function from the 3D object space to the 2D image space. In the RPC refinement step, determining the corrected RPC models comprises determining corrected projection functions by solving the optimization problem. This optimization problem aims at minimizing a reprojection error between locations in the 2D image space of key points detected in the set of images and projections, by the corrected projection functions, in the 2D image space of locations in the 3D object space of said key points.

The invention further comprises a step of determining a 3D point cloud representative of the ground surface area by triangulation, based on the corrected RPC models, of stereo correspondences within the set of images. The 3D point cloud is a set of data points in space, showing the 3D location of geographic features within the ground surface area. The 3D point cloud may be represented as a Digital Surface Model (DSM), i.e., a 2D grid where each cell is assigned an altitude value.

It shall be noted that according to the invention, while the corrected RPC models are used to determine a sparse 3D point cloud, the RPC model refinement step is implemented in a manner which is fully independent to any dense 3D reconstruction process.

The above steps may be implemented for several sets of images that provide stereo views of at least part of the ground surface area so as to determine a plurality of 3D point clouds representative of the ground surface area. As the RPC models are corrected previous to the triangulation of stereo correspondences, all these 3D point clouds are aligned and the invention may then comprise merging these 3D point clouds to provide a denser and highly accurate complete multi-view stereo reconstruction of the ground surface area. This merging may for instance be performed by taking the average height altitude at each DSM cell. The RPC refinement in accordance with the invention strengthens the consistency between the 3D point clouds, which proves beneficial to accurately measure elevation and topography over areas spanning several 3D point clouds, for applications such as land surveying, change detection, flooding risk assessment, or stockpiles volume monitoring.

The invention is based on the observation that measurement errors of the satellite geopositioning are mainly related to the attitude angles that define the sensor orientation. As in the case of satellite images, cameras are far from the Earth's surface (typically above 500 km), inaccurate knowledge of the satellite orientation proves to be the main component of the bundle adjustment reprojection error. In order to cope with this problem, the invention proposes to minimize the energy in the above equation of the reprojection error $\bar{\rho}$ by composing each projection function $P_m$ with a 3D rotation $R_m$.

More particularly, in accordance with the invention, determining the corrected projection functions comprises determining, for each of the original projection function, a 3D corrective rotation around the center of the remote imaging sensor to be applied in the 3D space before performing the original projection function.

It shall be noted that according to the invention, the 3D corrective rotation corrects the original RPC model itself on the contrary to prior approaches which rely on estimating a corrective rotation for an affine camera that approximates the original RPC model. Hence, the invention does not rely on the affine camera approximation and further provides a clean physical understanding of the problem, keeping the number of parameters to optimize very low.

Following the notation from the above equation, this amounts to finding the 3D rotations $\{R_m\}$, around each camera center $C_m$, that minimize:

$$\bar{\rho}(\{R_m\}, \{X_k\}) = \sum_{k=1}^{K} \sum_{m=1}^{M} \|P_m(R_m(X_k - C_m) + C_m) - x_{mk}\|^2$$

Once a solution is found which minimizes this reprojection error, the corrected projection function associated to the original projection function $P_m$ can be expressed as $P_m^{cor}(X) = P_m(R_m(X-C_m)+C_m)$ where X is a 3D point, $C_m$ is the camera center and $R_m$ is the corrective rotation estimated by bundle adjustment and which is applied in the 3D space before the original projection function is performed.

Bundle adjustment is essentially a parameter estimation problem. The variables to estimate consist of (1) the set of parameters that are necessary to correct each camera model for RPC inaccuracies, and of (2) (in case Ground Control Points of the ground surface area are not known or available and relative correction is therefore performed using tie points derived from image features) the coordinates of the tie points in the object space. The initial values of (1) are a set of initial rotations, while the initial values of (2) may be obtained as described below. All variables are optimized by means of an iterative process that seeks to minimize the reprojection error and ends with corrected tie points which projected with the corrected camera models should ideally match their corresponding 2D observations.

In an embodiment, the camera center $C_m$ associated with the original projection function $P_m$ corresponding to an original RPC model is determined by regressing a projective model from the original RPC model.

Indeed, the RPC camera model is a generalization of the projective camera model (if all the coefficients of the terms of degree 2 and 3 of the polynomials of the RPC model are set to zero, a projective camera model is found). In the projective model, the camera has a center through which passes all the light rays which intersect the scene and the image focal plane. In the RPC model, there is no real center and the camera is simply a function which associates a 2D point of the focal plane with any 3D point of the scene. In this embodiment therefore, defining a RPC camera "center" comprises determining a projective camera that approximates the RPC model and selecting the center of that projective model as the camera center $C_m$.

The projective camera model that approximates the RPC model can be estimated by solving an optimization problem. This optimization problem estimates the 12 coefficients of the projective camera model by minimizing the distance between the 2D image coordinates obtained with the RPC model on the one hand and the 2D image coordinates obtained with the projective camera on the other hand, for a set of 3D points that preferentially regularly sample the volume of interest. These 3D points are not necessarily real points of the scene, which would be visible in the images, but may be "virtual" 3D points whose coordinates can be regularly spaced along the three axes of longitude, latitude and altitude (for example, one point every 100 meters on each of the three axes, to form a 3D grid).

In an embodiment, the camera center $C_m$ remains fixed during the bundle adjustment step.

In an embodiment, the corrective rotation $R_m$ is initialized as the identity matrix. It may further be represented using the Euler angles $\phi$, $\theta$ and $\alpha$, which entails three values to optimize per camera, i.e.

$$R_m = R_x(\phi)R_y(\theta)R_z(\alpha) = \begin{pmatrix} 1 & 0 & 0 \\ 0 & \cos\phi & -\sin\phi \\ 0 & \sin\phi & \cos\phi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} \cos\alpha & -\sin\alpha & 0 \\ \sin\alpha & \cos\alpha & 0 \\ 0 & 0 & 1 \end{pmatrix}$$

To restrict the search of solutions in the object space, a reference camera may be frozen during the optimization process (i.e. its corrective rotation remains fixed to the identity). The camera with the largest number of tie point observations, out of all cameras connected to the largest number of nodes in the Epipolar Graph (see below), can be selected as the reference camera.

A block diagram of the method according to the invention is shown in FIG. 1 with the blocks concerning optional processing, aimed at improving the accuracy and/or the computational cost, being delimited in dashed lines. A set of input images SI, together with their metadata including the RPC model associated with each input image, is provided to a first macroblock CORR dedicated to the RPC refinement. Within this first macroblock CORR, a first set of blocks FT is dedicated (in the absence of GCPs) to feature tracking, which serves to initialize the image and object coordinates of a set of tie points observed across the input images. The tie points and their image observations $\{X_k\}$ and $\{x_{mk}\}$, together with the original RPC models $\{P_m\}$, are inputted to a second set of blocks BA of the first macroblock CORR dedicated to solving the bundle adjustment problem. Based on the solution, a corrected RPC model $P_m^{cor}$ fitted for each input image is provided to a second macroblock PC which is dedicated to determining a 3D point cloud, referenced as 3DPC in FIG. 1, representative of the ground surface area by triangulation, based on the corrected RPC models, of stereo correspondences within the input images.

The second set of blocks BA comprises a first block DEF dedicated to initializing the bundle adjustment by defining parameters thereof, such as the initial values for the set of rotations compensating for RPC inaccuracies, the initial values for the coordinates of the tie points in the object space and a certain threshold for stopping the numerical optimization when the change of a cost function falls below the threshold.

The second set of blocks BA comprises a second block BA2 dedicated to performing the bundle adjustment optimization described above which considers the squared distances between projected and observed locations and provides as outputs the corrected projection functions $\{P_m^{cor}\}$.

The result of the bundle adjustment is highly dependent on the quality of the input feature tracks found across the input images. The classic bundle adjustment loss considers the squared distances between projected and observed locations, since the $L^2$ norm is well-posed for differential calculus and the optimization converges rapidly. Nonetheless, this loss is sensitive to the presence of outliers, which can cause the result to be biased according to erroneous tracks at the expense of good observations. As a solution, a combination of the $L^1$ and $L^2$ losses such as the soft $L^1$ loss can be used.

Therefore, in a preferred embodiment, the bundle adjustment optimization may start with some initial iterations employing an $L^1$ cost function defined for instance as $c_{soft\text{-}l_1} = \Sigma_{i=1}^{2N_{obs}} 2(\sqrt{1+r_i^2} - 1)$ where r is the vector of residuals, with length $2N_{obs}$, containing the reprojection difference for each 2D coordinate of the $N_{obs}$ feature track observations. A second series of iterations follows employing an $L^2$ cost function, for instance defined using a classic sum of squared differences as $c_{l_2} = \Sigma_{i=1}^{2N_{obs}} r_i^2$. At the end of each series of iterations, the reprojection error $\bar{\rho}$ of each track observation is computed as the Euclidean norm of its residuals.

Since the $L^1$ cost function offers higher robustness to outliers than the $L^2$ cost function, the gap in terms of reprojection error between inlier and outlier observations should increase after the $L^1$ iterations. In presence of outliers, at the end of the $L^1$ iterations illustrated by block BA1 on FIG. 1, the sorted observation-wise errors for each image typically result in an emphasized elbow function. A threshold can then be set to filter outlier tie point observations as illustrated by block FTR on FIG. 1. After this filtering, the remaining tracks (presumably made of reliable inliers), containing at least two observations, are fed to the second series of iterations (block BA2 already discussed above), which yields the optimal estimator for Gaussian perturbations and quickly converges to the final solution.

The second set of blocks BA comprises a third block FIT dedicated to fitting a corrected RPC model for each input image. The corrected model encodes the corrected projection function $P_m^{cor}(X)$ which results from the composition of the estimated rotation matrix $R_m$ and the original projection function $P_m$. The RPC fitting error associated to a point whose 3D coordinates (X, Y, Z) and image coordinates (r, c) are known can be expressed as:

$$v_r = \frac{a(X,Y,Z)}{b(X,Y,Z)} - r = \frac{a^T u}{b^T u} - r$$

$$v_c = \frac{e(X,Y,Z)}{f(X,Y,Z)} - c = \frac{e^T u}{f^T u} - c$$

where $v_r$ and $v_c$ are the differences in pixel units between the projected and the real image coordinates. The vectors a, b, e and f contain 20 coefficients each, defining the cubic polynomials a, b, c and d that characterize the RPC projection function. The vector u, in turn, contains the variables associated to each RPC coefficient: $u = [1\ Z\ Y\ X\ ZY\ ZX\ YX\ Z^2\ Y^2\ X^2\ ZYX\ Z^2Y\ Z^2X\ Y^2Z\ Y^2X\ ZX^2\ YX^2\ X^3\ Y^3\ X^3]$. The corrected RPC is fitted by solving $\min_{a,b}\|vr\|$ and $\min_{e,f}\|vr\|$ with a sufficient amount of points.

As stated above, the bundle adjustment problem is solved based on the reprojection of a set of tie points across the input cameras. The list of 2D coordinates containing the observation of a 3D point across multiple images is known as a feature track. In an embodiment of the invention described below which does not rely on GCPs, the feature tracks result from stereo correspondences of distinctive keypoints.

To this purpose, the method may comprise performing feature detection within the images SI, as for instance illustrated by a first block FD of the first set of blocks FT. Distinctive keypoints from the input images are extracted, for instance using the SIFT (Scale-Invariant Feature Transform) method which identifies each SIFT keypoint by a descriptor, invariant to image translation, rotation, and scaling. In an embodiment, affine invariant keypoint descriptors are extracted, for instance using an affine invariant image matching algorithm such as Affine-SIFT (ASIFT), to allow matching image pairs with large convergence angles such as the ones produced by SkySat. For large satellite images, limiting the maximum number of keypoints per view can be useful to regulate the cost of the matching stage, which typically represents the bottleneck of feature tracking algorithms. To this end, the SIFT features of each image can be ordered from the coarsest to finest scale and the first Nkp keypoints in the list, most likely to be seen in other images, can be selected to proceed to the matching stage.

Feature detection is followed by a stereo pairs selection illustrated by a second block SPS of the first set of blocks FT and which consists in defining which pairs of images are suitable to be matched to construct the feature tracks and which pairs can be omitted. Avoiding unnecessary pairs is the most effective way to save computational time and prevent undesired mismatches, which would result in erroneous tie points for bundle adjustment. The selection of suitable pairs to match from all possible stereo pairs can be based on the projected area overlap between the two images. Then, among the selected pairs, the subset of pairs offering a well-posed baseline-to-altitude ratio can be defined as pairs to match to define the 3D tie point associated to each feature track, while the other selected pairs can be kept to contribute to the reprojection error of the bundle adjustment step if they are part of a feature track containing observations in at least one triangulation pair.

The stereo pairs selection is followed by a pairwise matching illustrated by a third block PM of the first set of blocks FT. For each stereo pair to match, SIFT keypoints are matched, for instance using a Fast Approximate Nearest Neighbours algorithm with automatic configuration. The matching search is restricted to points located inside those regions of the images that correspond to the intersection between their geographic footprints. Possible mismatches in the feature track observations can strongly undermine the bundle adjustment performance, leading to failure or strong biases. Erroneous matches can be eliminated by means of a distance ratio test, followed by a RANSAC geometric filtering. Finally, the geographic coordinates of the pairwise matches can also be used to further remove outlier matches. For each pair, the geographic distance in meters between the approximate geographic coordinates of matched keypoints is computed by localizing the image points in the object space using a reference altitude. The geographic distances between the resulting points should concentrate around an offset induced by the RPC errors. In presence of outliers, such distances, if sorted, typically describe an elbow shaped function which can be used to automatically set another outlier rejection threshold.

The pairwise matching is followed by a feature tracks construction illustrated by a fourth block FTC of the first set of blocks FT. The recursive union-find algorithm can be used to efficiently extend pairwise matches to feature tracks of arbitrary length. Keypoints that belong to the same track are assigned a common parent value.

The feature tracks construction is followed by a feature tracks triangulation illustrated by a fifth block FTT of the first set of blocks FT. The object coordinates of the tie point that projects onto each feature track are initialized by triangulating all the pairwise matches of the track and taking the mean of the resulting 3D locations. The RPC triangulation algorithm is employed to triangulate stereo correspondences with the original RPC camera models.

The feature tracks triangulation can be followed by an optional feature tracks selection illustrated by a sixth block FTS of the first set of blocks FT. In large-scale scenes, using an optimal subset of tracks may benefit bundle adjustment in two ways. First, it can speed up the process and reduce memory usage by removing redundant constraints. Second, it can increase the calibration accuracy due to the rejection of tracks with higher localization error. Hence, a feature tracks selection can be performed to select an optimal subset of feature tracks for bundle adjustment. The selection can for instance be regulated by an hyperparameter $K_{EG}$ that sets how many spanning trees of the epipolar graph (EG) can be covered using the output subset. In the EG, each view is a node and edges represent the epipolar relationship between pairs of nodes. Each of the $K_{EG}$ spanning trees seeks to select a number of tracks, from those not chosen before, that can be used to connect all nodes in the EG. The final result of the selection corresponds to the union of the feature tracks selected by all spanning trees. Note that $K_{EG}$ indirectly controls the number of selected tracks, since higher values will result in the union of subsets found by a wider variety of spanning trees.

Each spanning tree is constructed following a logic that establishes which cameras of the EG have to be visited first and which of the tracks visible in each camera have to be considered first. Tracks can be ranked using the following criteria: first, comparing the number of images where they are visible (track length), i.e. longer tracks are given higher priority; then, for those tracks with the same length, the average SIFT scale of the keypoints (track scale) is considered, i.e. lower-scale tracks, susceptible of being located with higher precision, have higher priority; finally, for those tracks equal in length and scale, the ones with lower cost have a higher priority (track cost). The cost associated to the j-th track, denoted as $T_j$, can be defined as $\mathrm{cost}(T_j) = \mathrm{mean}(\bar{\rho}(T_j)) + \mu \cdot \mathrm{std}(\bar{\rho}(T_j))$, where $\bar{\rho}(T_j)$ is the reprojection errors of all observations in track $T_j$ and $\mu$ is a balancing factor.

Based on the track ranking, an inverted list, which stores the visible tracks per camera from higher to lower priority, is generated. Parallel to this, cameras are sorted using a series of weights. The weight associated to the camera of the i-th view, denoted as Ci, is defined as $w(C_i) = n(C_i) + e^{-\mathrm{cost}(C_i)}$, where n(Ci) is the number of neighbor cameras of Ci and cost(Ci) is computed similarly to the track cost, taking the mean and standard deviation of the average reprojection errors for all tracks visible in Ci. Following this logic, for each spanning tree, cameras with larger weights are visited first, and, for each camera, tracks are considered according to the descending priority order.

The performance of the proposed bundle adjustment method for RPC correction was assessed on time series of SkySat acquisitions over two different areas of interest. The following evaluation metrics were employed:

Number of feature tracks ($N_{tracks}$): it corresponds to the average number of feature tracks employed for each date of the input time series;

Number of iterations ($N_{iters}$): it corresponds to the average number of iterations employed to solve the optimization problem for each date of the input time series. This number results from the addition of the iterations required to minimize the cost functions employed in block BA2 and in block BA1;

Reprojection error ($\bar{\rho}$): it amounts to the average reprojection error, in terms of Euclidean distance and measured in pixels, that is obtained from all feature track observations;

DSM heights deviation ($\sigma_{height}$): this measure quantifies the consistency of corresponding height values retrieved from different stereo pairs of the same acquisition date. It results from computing the average point-wise standard deviation, in height and measured in meters, of the 2D points that are seen in more than one of the stereo DSMs. Ideally, these DSMs should be exactly coincident, with standard deviation equal to zero. In practice, a small amount of noise derived from the computation of depth from stereo can be expected, but this indicator should reach values as close to zero as possible.

The results are compiled in the below table where BA-v1 corresponds to the presented bundle adjustment method using all the non-optional blocks and none of the optional blocks (see FIG. 1), BA-v2 incorporates the two optional blocks BA1 and FTR from the bundle adjustment stage dedicated to filter outlier tie point observations and BA-v3 additionally activates the feature tracks selection of block FTS, thus employing all blocks in FIG. 1.

|  |  | $N_{tracks}$ | $N_{iter}$ | $\bar{\rho}$ before BA [px] | $\bar{\rho}$ after BA [px] | $\sigma_{height}$ [m] |
|---|---|---|---|---|---|---|
| Area of interest #1 | Unrefined RPC models | — | — | — | — | 1.472 |
|  | BA RPC correction (BA-v1) | 4310 | 17 | 1.327 | 0.133 | 0.291 |
|  | BA-v1 + filter after soft-L1 iterations (BA-v2) | 4309 | 50 | 1.326 | 0.132 | 0.290 |
|  | BA-v2 + feature tracks selection (BA-v3) | 197 | 35 | 1.697 | 0.167 | 0.295 |
| Area of interest #2 | Unrefined RPC models | — | — | — | — | 2.675 |
|  | BA RPC correction (BA-v1) | 76943 | 8 | 1.352 | 0.178 | 0.662 |
|  | BA-v1 + filter after soft-L1 iterations (BA-v2) | 76594 | 94 | 1.291 | 0.129 | 0.434 |

| | $N_{tracks}$ | $N_{iter}$ | $\bar{\rho}$ before BA [px] | $\bar{\rho}$ after BA [px] | $\sigma_{height}$ [m] |
|---|---|---|---|---|---|
| BA-v2 + feature tracks selection (BA-v3) | 1094 | 56 | 1.829 | 0.206 | 0.370 |

The most important ideas reflected in Table 1 are listed and discussed below.

BA RPC correction results in accurate DSM registration. The bundle adjusted RPC models succeed to accurately align in the object space the DSMs reconstructed from different stereo pairs of the same acquisition date. This is reflected by the low deviation of height values, $\sigma_{height}$, which reaches average values of a few tens of centimeters for both series, typically below half meter. Similar $\sigma_{height}$ are obtained for area of interest #1, regardless of the bundle adjustment configuration (BA-v1, BA-v2 or BA-v3). This seems reasonable as this area represents a particularly well-posed scenario, where the maximal number of feature tracks is not particularly high and strong outliers in the tie points are not to be expected, given that the area is small and mostly flat. Things are different for area of interest #2, which covers a vast and mountainous area, with a more irregular relief. Thus, a larger amount of feature tracks needs to be handled and matching inaccuracies may push outlier tie points further away in the object space. The $\sigma_{height}$ associated to the area of interest #2 strongly improves from BA-v1 to BA-v3, showing the benefits of the reprojection error filtering after some initial iterations (BA-v2), as well as the feature track selection (BA-v3). Using the complete pipeline (BA-v3) reduces $\sigma_{height}$ almost to the half of what is obtained with the basic blocks (BA-v1).

Feature track selection improves bundle adjustment convergence and accuracy. The average number of bundle adjustment iterations decreases significantly when a suitable subset of feature tracks is selected.

The invention is not limited to the method described above but also extends to a system for forming a 3D reconstruction of a ground surface area by stereophotogrammetry, said system comprising a processor configured to perform the steps of the method described above, in particular the steps of:
  determining corrected Rational Polynomial Camera, RPC, models by performing bundle adjustment of original RPC models each provided with an image of a set of images of the ground surface area acquired by a remote imaging sensor and each associated to a corresponding original projection function from a 3D object space to a 2D image space, wherein determining the corrected RPC models comprises determining corrected projection functions from the 3D object space to the 2D image space and wherein determining the corrected projection functions comprises determining, for each of the original projection function, a 3D corrective rotation around a remote imaging sensor center to be applied in the 3D space before performing the original projection function; and of
  determining a 3D point cloud representative of the ground surface area by triangulation, based on the corrected RPC models, of stereo correspondences within images of the set of images.

The invention also relates to a computer program product comprising code instructions which, when the program is executed by a computer, cause the computer to carry out the method described above. The invention further relates to a non-transitory computer medium having stored thereon code instructions which, when executed by a processor, cause the processor to implement the method described above.

The invention claimed is:

1. A computer-implemented method for the 3D reconstruction of a ground surface area by stereophotogrammetry, comprising the steps of:
  determining corrected Rational Polynomial Camera, RPC, models by performing bundle adjustment (BA) of original RPC models each provided with an image of a set of images of the ground surface area acquired by a remote imaging sensor and each associated to a corresponding original projection function ($\{P_m\}$) from a 3D object space to a 2D image space, wherein determining the corrected RPC models comprises determining corrected projection functions ($\{P_m^{cor}\}$) from the 3D object space to the 2D image space and wherein determining the corrected projection functions comprises determining, for each of the original projection function, a 3D corrective rotation around a remote imaging sensor center to be applied in the 3D space before performing the original projection function; and
  determining (PC) a 3D point cloud representative (3DPC) of the ground surface area by triangulation, based on the corrected RPC models, of stereo correspondences within images of the set of images.

2. The computer-implemented method of claim 1, further comprising, for each of the original projection functions, determining a projective model that approximates the original RPC model corresponding to the original projection function and selecting the center of that projective model as the remote imaging sensor center.

3. The computer-implemented method of claim 1, wherein determining the corrected projection functions comprises determining, for each of the original projection function $P_m$, a corrected projection function expressed as $P_m^{cor}(X) = P_m(R_m(X - C_m) + C_m)$ where X is a 3D point, $C_m$ is the remote imaging sensor center and $R_m$ is the 3D corrective rotation which is applied in the 3D space before the original projection function is performed.

4. The computer-implemented method of claim 3, wherein determining the corrected projection functions comprises solving an optimization problem aiming at minimizing a reprojection error between locations in the 2D image space ($\{x_{mk}\}$) of key points detected in the set of images and projections, by the corrected projections, in the 2D image space of locations in the 3D object space ($\{X_k\}$) of said key points.

5. The computer-implemented method of claim 4, wherein the optimization problem is initialized with each 3D corrective rotation being set as an identity rotation.

6. The computer-implemented method of claim 4, wherein the optimization problem is initialized with a 3D corrective rotation associated to one of the original projection functions being set as unmodifiable.

7. The computer-implemented method of claim 4, wherein the reprojection error is expressed as $\bar{\rho} = \sum_{k=1}^{K} \sum_{m=1}^{M} \|P_m(R_m(X_k - C_m) + C_m) - x_{mk}\|^2$, where $x_{mk}$ is the location in the 2D image space of a key point detected in an image of the set of images and $X_k$ is the location in the 3D object space of said key point.

8. The computer-implemented method of claim 4, wherein the optimization problem is iteratively solved by a first set of iterations performed until a $L^1$-norm cost function falls below a first threshold and by a second set of iterations performed after said first set of iterations until a $L^2$-norm cost function falls below a second threshold.

9. The computer-implemented method of claim 8, further comprising:
   after the first set of iterations, comparing a keypoint reprojection error to a rejection threshold, wherein a keypoint reprojection error is the difference between a keypoint location in the 2D image space and a projection, by a corrected projection determined by the first set of iterations, in the 2D image space of the keypoint location in the 3D object space;
   rejecting keypoints which keypoint reprojection error is above the rejection threshold before performing the second set of iterations.

10. The computer-implemented method of claim 4, further comprising a preliminary step of determining locations in the 2D image space and in the 3D object space of a set of tie points and wherein the optimization problem is initialized with each key point being set as a tie point of said set of tie points.

11. The computer-implemented method of claim 10, wherein said preliminary step comprises detecting distinctive points in the set of images by performing an affine invariant image matching operation.

12. The computer-implemented method of claim 11, wherein said preliminary step further comprises triangulating, based on the original RPC models, stereo correspondences of the distinctive points within the images of the set of images.

13. The computer-implemented method of claim 10, further comprising rejecting tie points from the set of tie points before initializing the optimization problem.

14. A system for forming a 3D reconstruction of a ground surface area by stereophotogrammetry, comprising a processor configured to perform the steps of:
   determining corrected Rational Polynomial Camera, RPC, models by performing bundle adjustment (BA) of original RPC models each provided with an image of a set of images of the ground surface area acquired by a remote imaging sensor and each associated to a corresponding original projection function ($\{P_m\}$) from a 3D object space to a 2D image space, wherein determining the corrected RPC models comprises determining corrected projection functions ($\{P_m^{cor}\}$) from the 3D object space to the 2D image space;
   determining (PC) a 3D point cloud representative (3DPC) of the ground surface area by triangulation, based on the corrected RPC models, of stereo correspondences within images of the set of images;
   wherein determining the corrected projection functions comprises determining, for each of the original projection function, a 3D corrective rotation around a remote imaging sensor center to be applied in the 3D space before performing the original projection function.

15. A non-transitory computer medium having stored thereon code instructions that, when executed by a processor, cause the processor to implement the method of claim 1.

* * * * *